United States Patent
Ikuta et al.

(10) Patent No.: US 9,039,525 B2
(45) Date of Patent: May 26, 2015

(54) GAME PROVIDING DEVICE, GAME PROVIDING METHOD AND NON-TRANSITORY COMPUTER-READABLE STORAGE MEDIUM STORING GAME PROGRAM

(71) Applicant: DeNA Co., Ltd., Tokyo (JP)

(72) Inventors: Yuuki Ikuta, Tokyo (JP); Hiroshi Imano, Tokyo (JP); Yuki Hatanaka, Tokyo (JP); Megumi Tanabe, Tokyo (JP)

(73) Assignee: DENA CO., LTD., Tokyo (JP)

( * ) Notice: Subject to any disclaimer, the term of this patent is extended or adjusted under 35 U.S.C. 154(b) by 0 days.

(21) Appl. No.: 14/218,780

(22) Filed: Mar. 18, 2014

(65) Prior Publication Data

US 2014/0295962 A1 Oct. 2, 2014

(30) Foreign Application Priority Data

Mar. 28, 2013 (JP) .................................. 2013-069456

(51) Int. Cl.
| | |
|---|---|
| A63F 9/24 | (2006.01) |
| A63F 13/35 | (2014.01) |
| A63F 13/822 | (2014.01) |
| A63F 13/58 | (2014.01) |

(52) U.S. Cl.
CPC ............... *A63F 13/35* (2014.09); *A63F 13/822* (2014.09); *A63F 13/58* (2014.09)

(58) Field of Classification Search
CPC ... A63F 2300/807; A63F 13/00; A63F 13/12; A63F 2300/61; A63F 2300/66; A63F 13/58; A63F 13/822; A63F 13/35
USPC .................................................. 463/30–33, 42
See application file for complete search history.

(56) References Cited

U.S. PATENT DOCUMENTS

| | | | |
|---|---|---|---|
| 2004/0176163 A1* | 9/2004 | Ishihata et al. ................... 463/30 |
| 2005/0187023 A1* | 8/2005 | Miyamoto et al. ............... 463/43 |
| 2007/0060231 A1* | 3/2007 | Neveu et al. ....................... 463/5 |
| 2008/0119268 A1* | 5/2008 | Kando et al. ..................... 463/31 |
| 2012/0309509 A1* | 12/2012 | Kitamura et al. ............... 463/29 |
| 2012/0322523 A1* | 12/2012 | Woodard et al. .................. 463/2 |

FOREIGN PATENT DOCUMENTS

| | | |
|---|---|---|
| JP | 2000-197767 A | 7/2000 |
| JP | 2008-245987 A | 10/2008 |
| JP | 2010-017395 A | 1/2010 |

* cited by examiner

*Primary Examiner* — Steve Rowland

(57) ABSTRACT

The present invention provides a game providing device that generates image information including a plurality of objects that are capable of being selected by the player; sets a processing method of each of the objects; receives a selection of an object or a plurality of objects from among the objects; and performs the processing method set for the selected object.

11 Claims, 12 Drawing Sheets

FIG. 3

GROUP MEMBER DATABASE

| PLAYER A |
|---|
| PLAYER B |
| PLAYER C |
| ⋮ |

FIG. 4

GAME DATABASE PLAYER A

| OPPONENT CHARACTER TYPE | X |
|---|---|
| OPPONENT CHARACTER LEVEL | 2 |
| OPPONENT CHARACTER POINT | 4000 |
| OPPONENT CHARACTER DEFEAT NUMBER | 5 |
| BACKUP COMBO | 0 |
| BACKUP PLAY | – |

FIG. 5

OPPONENT CHARACTER DATABASE

| PLAYER | LEVEL |
|---|---|
| PLAYER A | 2 |
| PLAYER B | 1 |
| PLAYER C | 8 |
| ⋮ | ⋮ |

FIG. 6

PLAYER CHARACTER DATABASE

| PLAYER | LEVEL | POINT | POINT RECOVERY |
|---|---|---|---|
| PLAYER A | 3 | 2 | 3 |
| PLAYER B | 1 | 3 | 0 |
| PLAYER C | 20 | 3 | 5 |
| ⋮ | ⋮ | ⋮ | ⋮ |

FIG. 9A

DAMAGE DATABASE

| DAMAGE ID | 26a | 26b | 26c |
|---|---|---|---|
| 00001 | SERIOUS DAMAGE | MINOR DAMAGE | MINOR DAMAGE |
| 00002 | MINOR DAMAGE | SERIOUS DAMAGE | MINOR DAMAGE |
| 00003 | MINOR DAMAGE | MINOR DAMAGE | SERIOUS DAMAGE |

FIG. 9B

DAMAGE DATABASE

| DAMAGE ID | ONE POINT | TWO POINTS | THREE POINTS |
|---|---|---|---|
| 00001 | SERIOUS DAMAGE | MINOR DAMAGE | MINOR DAMAGE |
| 00002 | MINOR DAMAGE | SERIOUS DAMAGE | MINOR DAMAGE |
| 00003 | MINOR DAMAGE | MINOR DAMAGE | SERIOUS DAMAGE |

FIG. 11

INCENTIVE DATABASE

| OPPONENT CHARACTER | DEFEAT NUMBER | INCENTIVE |
|---|---|---|
| CHARACTER X | – | POINT RECOVERY |
| CHARACTER Y | – | ATTACK STRENGTH ENHANCEMENT |
| CHARACTER Z | 5 | ITEM O |
| CHARACTER Z | 10 | ITEM P |
| CHARACTER Z | 15 | ITEM Q |
| ⋮ | ⋮ | ⋮ |

GAME PROVIDING DEVICE, GAME PROVIDING METHOD AND NON-TRANSITORY COMPUTER-READABLE STORAGE MEDIUM STORING GAME PROGRAM

BACKGROUND OF THE INVENTION

1. Field of the Invention

The present invention relates to a game providing device, a game providing method and a non-transitory computer-readable storage medium storing game program that are capable of using a social network.

2. Description of Related Art

A game providing device that provides a game, for example, in which a player character launches an attack on the opponent character such that the player character beats the opponent character by giving damage to the opponent character is known commonly. For example, a method in which operating a player character designates and attacks a predetermined portion of the opponent character.

In general, such a game is often configured to notify the player of how much damage the player has given to the opponent character. Furthermore, such a game is sometimes configured to change the damage or effect on the opponent character by letting the player select a method for attacking the opponent character, for example, the use of magic or the activation of a skill.

SUMMARY OF THE INVENTION

By the way, the player can expect the damage that the player character can give to the opponent character before the attack to some extent in such a game. Thus, the player is easily bored of the game.

In light of the foregoing, an objective of the present invention is to provide a game providing device, a game providing method and a non-transitory computer-readable storage medium storing game program that are capable of using a social network with a high attractiveness.

An aspect of the present invention is a game providing device that includes an image information generating unit configured to generate image information including a plurality of objects that are capable of being selected by the player and are for a subject to be processed; a selection receiving unit configured to receive a selection of an object or a plurality of objects from among the objects; a setting unit configured to set a processing method of each of the objects selected in the selection receiving unit every time the selection receiving unit has received the selection of the objects, and the game providing device performs the processing method set for the selected object on the subject to be processed.

According to the present invention, it is preferable that the setting unit stochastically set a processing method of each of the objects selected in the selection receiving unit every time the selection receiving unit has received a selection of the object.

It is preferable that the subject to be processed be an opponent character, and the setting unit set a process of each of the selected objects for giving different damage points to the opponent character when the selection receiving unit has received the selection of the objects.

It is preferable that the subject to be processed be an opponent character, and the setting unit set a process for giving different damage points to the opponent character according to a number of the selected objects when the selection receiving unit has received the selection of the objects.

It is preferable that the selection receiving unit be capable of receiving a selection of a number of the objects corresponding to a previously stored consumption point.

It is preferable that the game providing unit perform the setting using the setting unit again every time the processing method is performed.

It is preferable that the setting unit increase the damage point of the object selected in the selection receiving unit according to the damage point set for the object previously selected in the selection receiving unit.

It is preferable that the image information generating unit further generate image data including a backup character according to the damage point set for the selected object.

It is preferable that the game providing device be connectable to a plurality of clients, include a backup receiving unit configured to receive a backup from the client, and increase the damage point of the selected object when receiving the backup.

It is preferable that the image information generating unit further generate image data including a backup character when the game providing device has received the backup.

It is preferable that the game providing device perform a predetermined process on a player using a client doing the backup when receiving the backup.

It is preferable that the game providing device be connectable to a plurality of clients, and transfer information about an opponent character of a player using one of the clients to a player using other clients among the clients.

Another aspect of the present invention is a game providing method for causing a computer to perform a process including generating image information including a plurality of objects that are capable of being selected by the player and are for a subject to be processed; receiving a selection of an object or a plurality of objects from among the objects; setting a processing method of each of the objects selected in a selection receiving unit every time the selection receiving unit has received the selection of the objects, and performing the processing method set for the selected object on the subject to be processed.

An aspect of the present invention is a non-transitory computer-readable storage medium storing game program for causing a computer to execute a process including generating image information including a plurality of objects that are capable of being selected by the player and are for a subject to be processed; receiving a selection of an object or a plurality of objects from among the objects; stochastically setting a processing method of each of the objects selected in a selection receiving unit every time the selection receiving unit has received the selection of the objects to store the processing method to a storage unit, and performing the processing method set for the selected object on the subject to be processed.

According to the present invention, a process is performed according to an object or a plurality of objects selected from among a plurality of objects. This enables the player to enjoy the game with strategic characteristics.

BRIEF DESCRIPTION OF THE DRAWINGS

FIG. 3 is a diagram illustrating an exemplary registration in a group member database according to an embodiment of the present invention;

FIG. 4 is a diagram illustrating an exemplary registration in a game database according to an embodiment of the present invention;

FIG. 5 is a diagram illustrating an exemplary registration in an opponent character database according to an embodiment of the present invention;

FIG. 6 is a diagram illustrating an exemplary registration in a player character database according to an embodiment of the present invention;

FIGS. 9A and 9B are diagrams illustrating an exemplary registration in a damage database according to an embodiment of the present invention;

FIG. 11 is a diagram illustrating an exemplary registration in an incentive database according to an embodiment of the present invention;

DETAILED DESCRIPTION OF THE INVENTION

Hereinafter, the embodiment of the present invention will be described based on the drawings.

<Whole Configuration of System>

Figure 1:
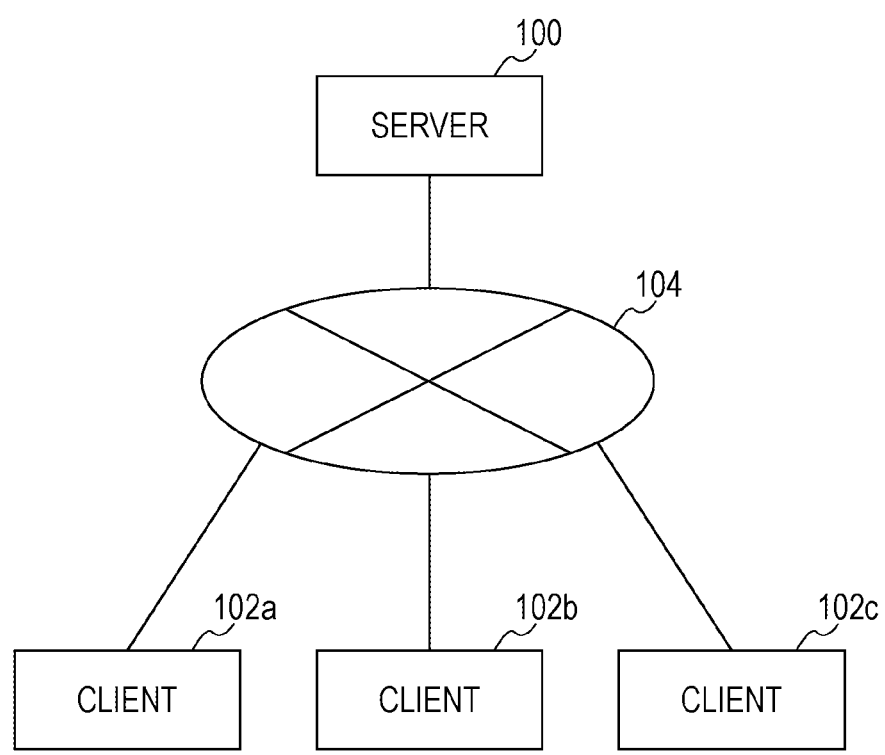
FIG. 1 is a diagram illustrating a configuration of a game providing system according to an embodiment of the present invention.

FIG. 1 is a diagram illustrating the configuration of a game providing system according to the present embodiment. A server 100 is connected to clients 102 (102a, 102b, and 102c . . . ) to be able to exchange the information with the clients. For example, the server 100 is connected to each of the clients 102 through a network 104 such as the Internet.

The server 100 is a computer and has various functions such as a data processing function, a communication function, and a storage function. The server 100 stores, for example, user data used for executing a game logic and a game.

The client 102 is typically a mobile terminal such as a mobile phone, a smartphone, or a tablet, and can also be a personal computer (PC) or the like. The client 102 includes various functions such as a data processing function, a communication function, a storage function, a display function, and an input function. The client 102 obtains a necessary non-transitory computer-readable storage medium storing game program (game logic) or data from the server 100 through the network 104 to perform a process, for example, for a game. The client 102 displays a screen including a background and a character using the display function and receives an instruction from the player using the input function depending on the progress of the game.

<Game Providing Method>

Figure 2:
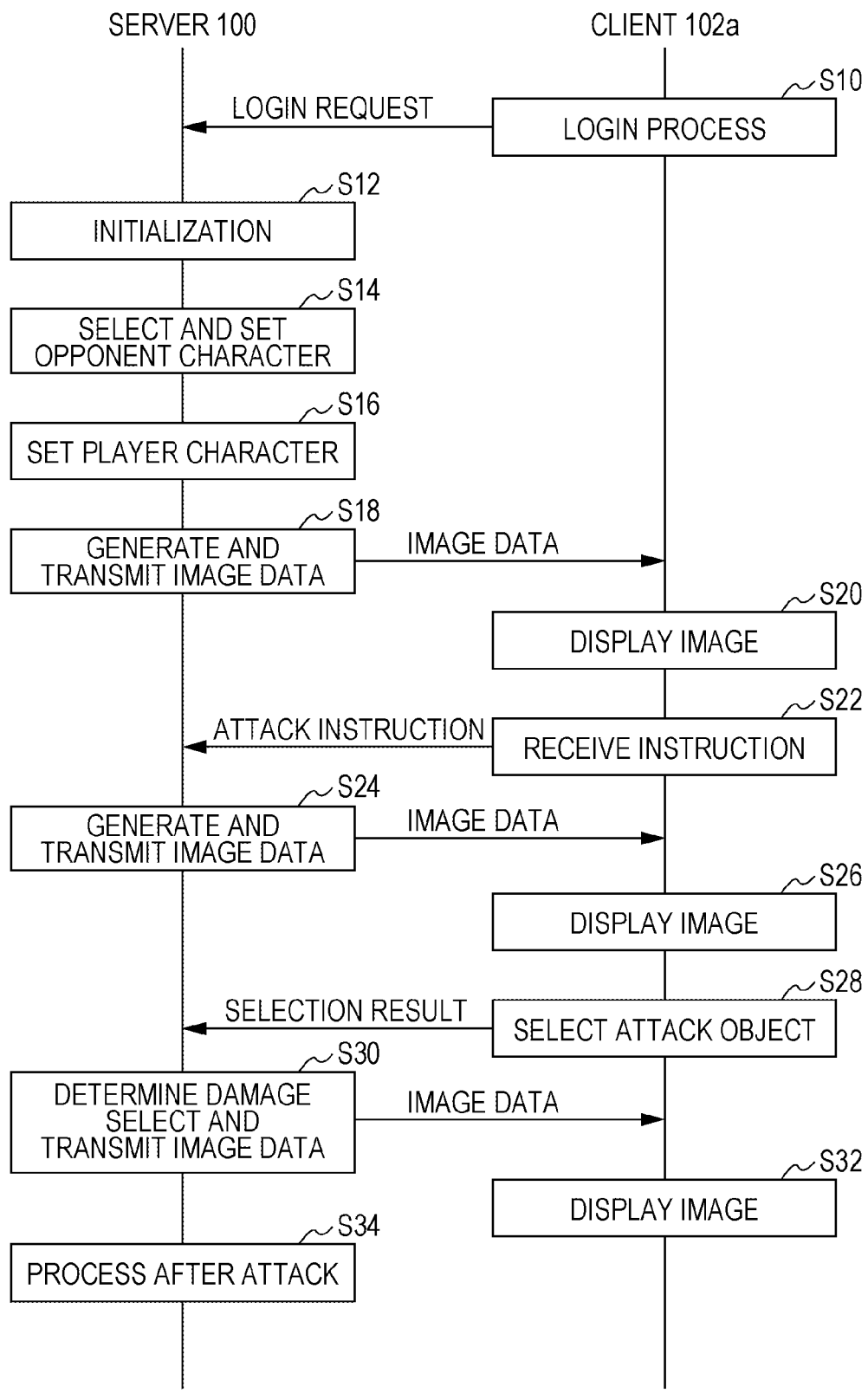
FIG. 2 is a flowchart illustrating a game providing method according to an embodiment of the present invention.

A game providing method in the embodiment of the present invention will be described. The game providing method is performed along the flowchart illustrated in FIG. 2. The server 100 and the client 102 implement the processes to be described below by performing a server non-transitory computer-readable storage medium storing game program (server logic) and a client non-transitory computer-readable storage medium storing game program (client logic), respectively.

While the player can progress the game alone in the game providing method in the present embodiment, the player can also gain the cooperation of another player in the group connected to the server 100 through the network 104. It is assumed in the description below that players A, B, and C have previously been registered as the players in the server 100 with the clients 102a, 102b, and 102c, respectively. One of the players accesses the server 100 using the client 102. This transmits the client non-transitory computer-readable storage medium storing game program (game logic) to the client 102 from the server 100 such that the game progresses in the client 102 along the client non-transitory computer-readable storage medium storing game program (game logic).

The players A, B, and C have also been registered as the players in a group in advance. For example, the players that are friends with each other in an existing social network can be registered as the players in a group. The players that know each other can be the players in a group by approving each other. The players that are group members are registered in the group member database in the server 100 as illustrated in FIG. 3.

The client 102 performs a login process to the server 100 in step S10. Once one of the players sends a request for connecting to the server 100 using the client 102, the server 100 returns a request for inputting the authorization information about the login to the client 102. The player transmits the authorization information for the login, for example, the user name or the password to the server 100 using the input function of the client 102. The server 100 performs a matching process of the previously registered authorization information including the user name, password or the like and the authorization information with reference to the database in which the player is registered. When the authorization information matches the previously registered authorization information, the login as the player is allowed. For example, it is assumed that the player A performs the login process using the client 102a.

The initialization process is performed in step S12. The server 100 initializes the game when the registered player performs a login process. The type of the opponent character, the level of the opponent character, the points of the opponent character, the backup combo, and the backup play are reset in the game initialization process. The server 100 registers the situation of each player in the game as a game database as illustrated in FIG. 4. In that case, the data of the type of the opponent character, the level of the opponent character, the remaining points of the opponent character, the backup combo, and the backup play data is cleared.

An opponent character is selected and set in step S14. A type or a plurality of types of opponent character can be used in the game. Three types of opponent character, that is, a character X, a character Y, and a character Z are prepared in the present embodiment.

The server 100 selects an opponent character to appear in the play from among the prepared opponent characters. The opponent character can be selected along a preset sequence or can be selected according to a preset probability of appearance of each opponent character.

When the opponent character is selected along a predetermined sequence, the sequence can be set such that the opponent characters are repeatedly selected, for example, in order from the character X, the character Y, to the character Z. On the other hand, when the opponent character is selected according to the probability of appearance, the opponent character can be selected, for example, such that the character X appears with a probability of 60%, the character Y appears with a probability of 30%, and the character Z appears with a probability of 10%.

The damage points to be given to defeat the opponent characters can be set at a constant value regardless of the opponent characters or can be set at different values depending on the type of the opponent character.

Alternatively, the damage points can be set at different values depending on the level of the opponent character. For example, it is preferably set such that the damage point increases as the level of the opponent character increases. For example, the preset damage point of each opponent character can be increased by the value 0.1 times larger than the damage point every time the level of the opponent character increases by one.

When the level of the opponent character is used, the server 100 registers the level of the current opponent character of each player in the opponent character database as illustrated in FIG. 5. FIG. 5 illustrates an example in which the levels of the opponent characters of the players A, B, and C are set at two, one, and eight, respectively. The damage points required to defeat an opponent character can be a value obtained by multiplying the level of the opponent character by a predetermined value. For example, when the predetermined value is 2000, 2×2000=4000 points are set to the opponent character of the player A.

Furthermore, the damage points can be set by a combination of the type and level of the opponent character. For example, the damage points of the character X can be obtained using the value calculated from the level without any change, the damage point of the character Y can be obtained using the value 1.5 times larger than the level, and the damage point of the character Z can be obtained using the value two times larger than the level.

The selected opponent character, level, and points are registered in the game database. FIG. 4 illustrates an example in which the character X is selected as an opponent character, the level is set at two, and the damage points are set at 4000.

The level and point of the player character of the logged-in player are read in step S16.

The level of the player character is registered in a player character database as illustrated in FIG. 6. The player character database includes a predetermined initial value (for example, "one") for a player who has not played the game in the past, or the level that the player character of a player who has played the game in the past has reached. FIG. 6 illustrates an example in which the levels of the player characters of the players A, B, and C are three, one, and twenty, respectively.

The player character database includes a point (consumption point) to be used for an attack on the opponent character by each player. When the player has not played the game in the past, the point is set at a predetermined initial value (for example, "three"). When the player has played the game in the past, the points that the player character of the player has obtained in the past are registered. FIG. 6 illustrates an example in which the points of the player characters of the players A, B, and C are two, three, and three, respectively.

For example, the "three" and "two" are read as the level and point of the player character of the player A, respectively.

Furthermore, the player character database includes the available number of point recoveries. In that case, the number of point recoveries is increased when the player has defeated a predetermined opponent character. FIG. 6 illustrates an example in which the numbers of point recoveries of the player characters of the players A, B, and C are three, zero, and five, respectively. For example, the "three" is read as the number of point recoveries of the player character of the player A.

Screen data is transmitted to the client 102 in step S18. The server 100 generates the screen data of the game based on the contents of the game database set in steps S14 to S16 and transmits the screen data to the client 102.

Figure 7:
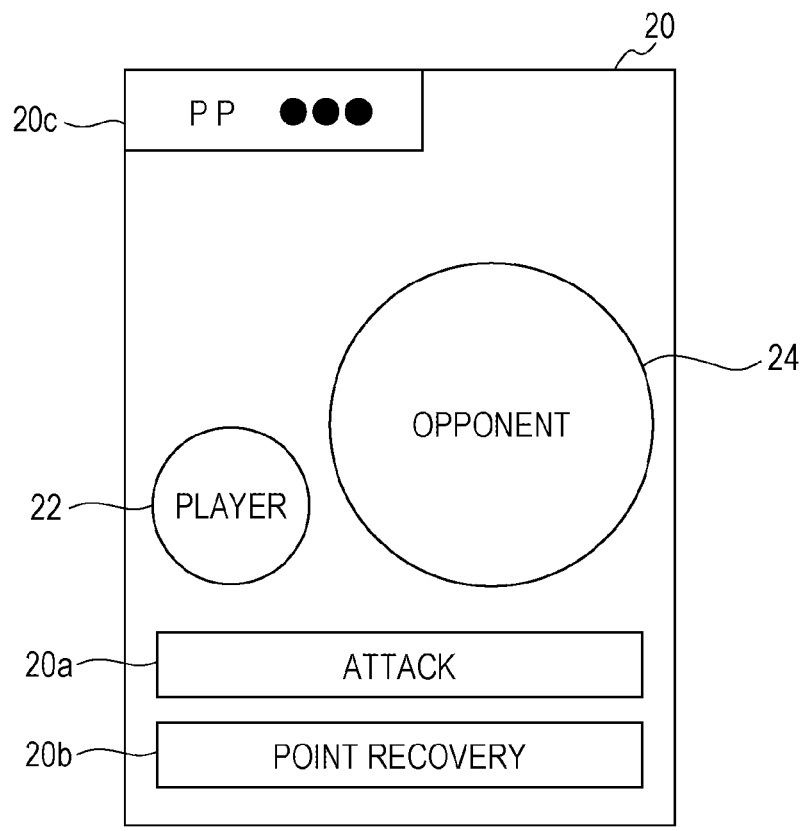
FIG. 7 is a diagram illustrating an exemplary welcome screen of the game according to an embodiment of the present invention.

The screen data is a combination of background image data 20, player character image data 22, and opponent character image data 24 as illustrated in FIG. 7. The background image data 20 includes an attack instruction button 20*a*, a point recovery button 20*b*, and player character point image data 20*c*.

In that case, the point recovery button 20*b* is preferably the image data according to the number of point recoveries of the player character read in step S16. For example, the image data preferably includes a number indicating the number of point recoveries. When the number of point recoveries is "zero", the image data preferably has a color inverted from the normal image date.

The player character point image data 20*c* is preferably the image data according to the number of points of the player character read in step S16. For example, the image data preferably displays the same number of marks (filled circles in FIG. 7) as the number of the points.

The player character image data 22 is preferably the image data adequate for the level of the player character. For example, the image data preferably conveys an image of a stronger character as the level of the player character increases. The opponent character image data 24 is preferably the image data differing depending on any of the type, the level of the opponent character and the combination thereof. For example, depending on the type or level of the opponent character, the image data preferably conveys an image of a stronger character as the damage point to defeat the opponent character increases.

The server 100 combines the image data as illustrated in FIG. 7 and transmits the image data to the client 102.

The image of the game is displayed on the client 102 in step S20. The client 102 receives the image data transmitted from the server 100 in step S18 and displays an image based on the image data on an image display unit such as a display using the display function such as a browser. This displays an image as illustrated in FIG. 7 on the client 102. Then, the client 102 comes into a state in which the client 102 waits for an attack instruction from the player.

A process for receiving, for example, an attack instruction, a point recovery instruction, or a completion instruction is performed on the client 102 in step S22. The player gives an instruction by designating any region of the attack instruction button 20*a* and the point recovery button 20*b* using the input function of the client 102 such as a touch panel, a keyboard, or a button.

When the player has designated the attack instruction button 20*a*, the client 102 transmits the instruction information indicating that an attack has been designated to the server 100. Then, the process goes to step S24.

Note that the process goes to the subroutine in step S50 when the player has designated the point recovery button 20b. A point recovery process will be described below.

Figure 8:
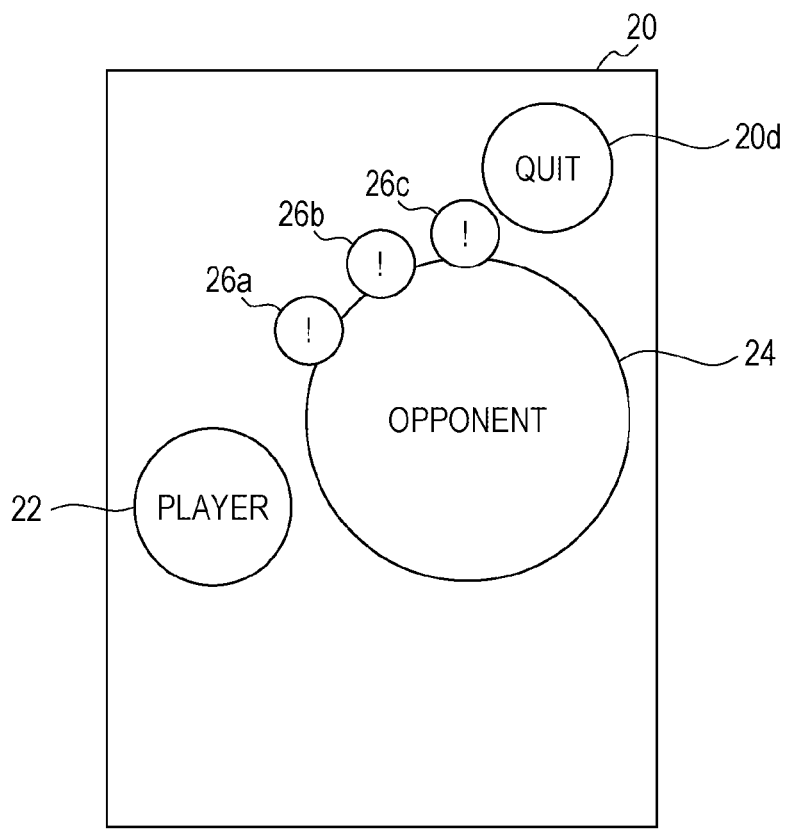
FIG. 8 is a diagram illustrating an exemplary screen in the game according to an embodiment of the present invention.

The image data including an attack object is transmitted to the client 102 in step S24. When receiving an attack instruction from the client 102, the server 100 generates the image data including a plurality of attack objects 26 and transmits the image data to the client 102. The image data can be obtained by superimposing the attack objects 26 on the image data generated in step S18 as illustrated in FIG. 8. FIG. 8 illustrates the image data including three attack objects 26a to 26c as an example. FIG. 8 illustrates that the image data includes a completion button 20d to indicate the completion of the selection from among the attack objects 26a to 26c.

At that time, the server 100 can transmit the image data indicating that an attack is impossible to the client 102 when the player does not have a point after confirming the remaining points of the player in the game with reference to the player character database. For example, the image data for displaying a sentence such as "an attack is impossible because the attack point is zero" can be transmitted.

An image of the game is displayed on the client 102 in step S26. The client 102 receives the image data transmitted from the server 100 in step S24 and displays an image based on the image data on an image display unit such as a display using the display function such as a browser. This displays an image as illustrated in FIG. 8 on the client 102. Then, the client 102 comes into a state in which the client 102 waits for the selection from among the attack objects by the player.

Note that, when receiving the image data indicating that an attack is impossible from the server 100, the client 102 can display an image according to the image data. In such a case, the process can return to step S20 after the image indicating that an attack is impossible has been displayed for a predetermined period of time.

A process for selecting an attack object is performed in step S28. The player selects at least one of the attack objects 26 using the input function of the client 102 such as a touch panel, a keyboard, or a button.

A point can be selected or a plurality of points can simultaneously be selected from among the attack objects 26. For example, one of the attack objects 26a to 26c can be selected or two or three of the attack objects 26a to 26c can simultaneously be selected in FIG. 8. As described above, increasing the number of methods for selecting one or more attack objects from among the attack objects 26 gives the player more choices of attacks on the opponent character in the range of the remaining attack points. This increases the amusement of the game.

However, the number of selectable points is limited up to the number of points of the player registered in the player character database. The number of points of the player can be transmitted to the client 102 such that the client 102 can perform a process for limiting the number of selectable points. Alternatively, the number of selectable points can be transmitted to the server 100 as needed such that the server 100 can perform a process for limiting the number of selectable points.

After the selection from among the attack objects 26 and the designation of the completion button 20d, the client 102 transmits the information specifying the selected attack object 26 to the server 100.

The damage point is determined and the image data is transmitted in the server 100 in step S30. Once receiving the result of the selection from among the attack objects 26 from the client 102, the server 100 determines the damage point to give to the opponent character according to the selected attack object 26.

The damage point can stochastically be set for each of the attack objects 26. For example, one of the attack objects 26 is determined as a "serious damage" and the other attack objects 26 are determined as "minor damages". Any of the attack objects 26 can stochastically be selected as the "serious damage". When there are three attack objects 26a to 26c, one of the attack objects 26a to 26c is stochastically selected as the "serious damage" for each attack. Then, the other attack objects 26 that have not been selected as the "serious damage" can be determined as the "minor damages".

As illustrated in FIG. 9A, a damage database can be provided such that the attack objects 26a to 26c includes the "serious damage" and the "minor damage" that are linked to a plurality of damage IDs. The server 100 selects one of the damage IDs every attack such that the damage of each of the attack objects 26 can be determined according to the pattern of the damage linked to the selected damage ID. A damage ID can be selected, for example, stochastically.

As illustrated in FIG. 9B, a damage database can be provided such that the attack objects 26a to 26c includes one of the "serious damage" and the "minor damage" according to the number of selected attack objects 26. The server 100 selects one of the damage IDs every attack such that the damage of each of the attack objects 26 can be determined according to the number of the attack objects 26 selected at the attack. A damage ID can be selected, for example, stochastically.

The specific number of the damage points of the "serious damage" and the "minor damage" can be predetermined. For example, the damage points of the "serious damage" are set at 3000 and the damage points of the "minor damage" are set at 500. When one of the attack objects 26 selected in step S28 is the "serious damage", the damage points given to the opponent character are set at the value corresponding to the "serious damage". When all of the selected attack objects 26 are the "minor damages", the damage points given to the opponent character are set at the value corresponding to the "minor damage".

Note that the type of damage can be divided into more types although the type of damage is divided into two types of damages: the "serious damage" and the "minor damage" in the present embodiment.

Furthermore, the damage points can be increased depending on the level of the player character. In such a case, the server 100 reads the level of the player registered in the player character database to increase the damage points according to the level. For example, the value 0.1 times larger than the damage points can be added to the damage points every time the level of the player character increases by one.

Note that a backup combo process or a backup play process can increase the damage points used for an attack on the opponent character in the present embodiment. The backup combo process or the backup play process will be described below.

Figure 10A:
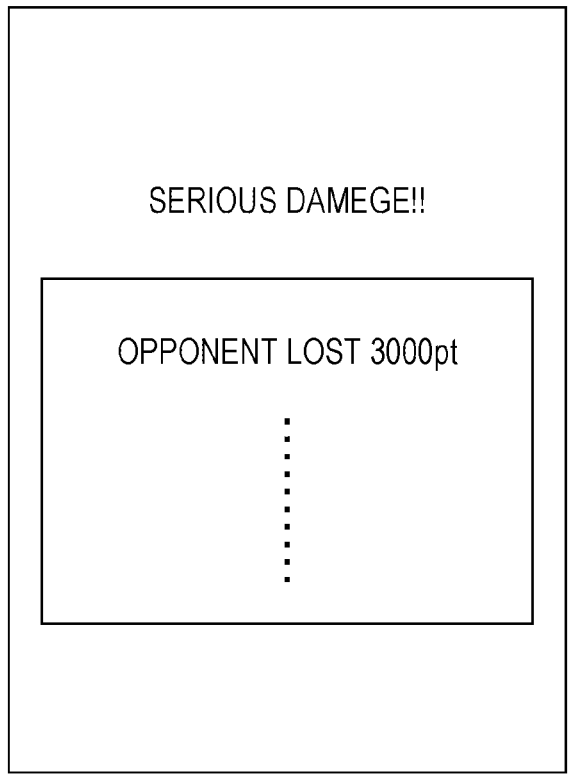
FIGS. 10A and 10B are diagrams illustrating an exemplary damage point display screen according to an embodiment of the present invention.
Figure 10B:
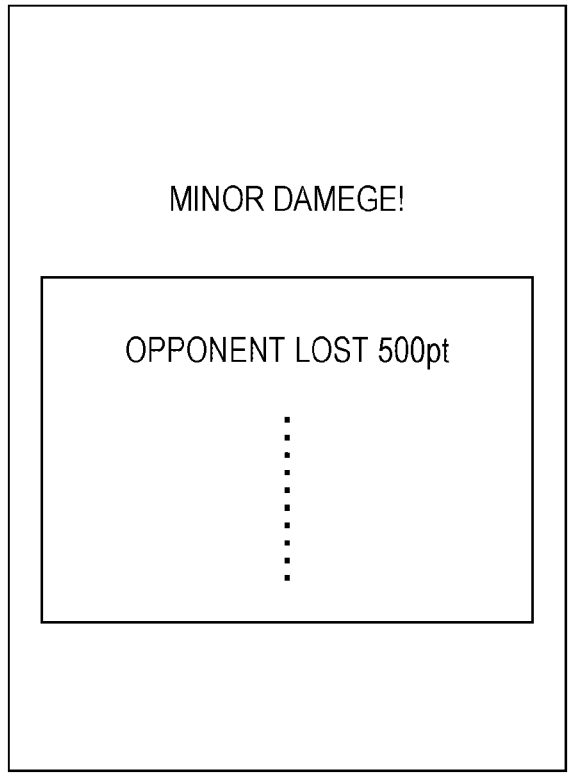

Once the damage point is determined, the server 100 selects the damage screen data to be displayed to the player. When one of the attack objects 26 selected in step S28 is the "serious damage", the server 100 selects the image data indicating the "serious damage" has been given. When all of the selected attack objects 26 are the "minor damages", the server 100 selects the image data indicating the "minor damage" has been given. For example, the image data indicating the "serious damage" has been given can be the image data as illustrated in FIG. 10A and, the image data indicating the "minor damage" has been given can be the image data as illustrated in FIG. 10B. The server 100 transmits the selected image data to the client 102.

The image is displayed on the client 102 in step S32. The client 102 receives the image data transmitted from the server 100 in step S30. The client 102 displays an image based on the image data on the image display unit such as a display using the display function such as a browser. This displays an image as illustrated in FIG. 10A or 10B on the client 102. Thus, the player can confirm how much damage the player's attack has given to the opponent character.

A process after the attack is performed in the server 100 in step S34. The server 100 performs a subtraction process from the points of the player character, a subtraction process from the points of the opponent character, and an incentive addition process.

In the subtraction process from the points of the player character, the server 100 subtracts the number of the selected attack objects 26 in step S28 from the points registered in the player character database. For example, when the player A has selected two attack objects 26, the server 100 subtracts two from the points of the player A registered in the player character database.

The server 100 subtracts the damage points on the opponent character determined in step S30 from the points of the opponent character registered in the game character database. For example, in the game database illustrated in FIG. 4, the server 100 subtracts 3000 from the remaining points of the opponent character of 4000 when the damage points are set at 3000.

At that time, when the point of the opponent character is larger than zero after the subtraction process, it is determined that the opponent character has not been defeated and then the process returns to step S16.

On the other hand, when the point of the opponent character is equal to or less than zero, it is determined that the opponent character has been defeated.

When defeating the opponent character, the player receives an incentive. The incentive that is given to the player when the player defeats the opponent is set to each opponent. Point recovery of the player character, attack strength enhancement (reinforcement), and addition of an item are cited as an example of the incentive. The incentive can vary depending on the number of defeats of each opponent character.

The server 100 registers the incentive of each opponent character as an incentive database as illustrated in FIG. 11. The server 100 performs a process according to the incentive depending on one of the type of the defeated opponent character, the number of defeats of the opponent character, and the combination thereof. FIG. 11 illustrates an example in which the point recovery of the player character is set to the character X, the attack strength enhancement (reinforcement) of the player character is set to the character Y, and items O, P, and Q according to the number of defeats are set to the character Z as incentives.

In the example, when a player has defeated the character X, the value of the point recovery of the player in the player character database is increased by one. This means that an item that recovers the point of the player character (consumption point) is added. When a player has defeated the character Y, the value of the level of the player in the player character database is increased by one. This means that the attack strength of the player character is upgraded. At that time, transmitting image data indicating that the attack strength has been reinforced to the client 102 and displaying the image data on the client 102 can notify the player of the upgrade of the attack strength of the player character.

When a player has defeated the character Z, the value of the number of defeats of the opponent character in the game database is increased by one. When the number of defeats of the opponent character is equal to or more than five, the item O is given to the player. When the number of defeats of the opponent character is equal to or more than ten, the item P is given to the player. When the number of defeats of the opponent character is equal to or more than fifteen, the item Q is given to the player. At that time, transmitting image data indicating each of the items O, P, and Q to the client 102 and displaying the image of each of the items on the client 102 can notify the player of the acquisition of each of the items. The effect of the acquisition of each of the items can arbitrarily be set. When the number of defeats of the opponent character is equal to or more than a predetermined number (fifteen in the present embodiment), the number of defeats of the opponent character in the game database can be reset.

The items are not especially limited. However, the items are preferably images that the player collects, or preferably enable the player to advantageously progress the game.

Furthermore, when a player has defeated the opponent character, the level of the opponent character is increased. The level of the opponent character of the player registered in the opponent character database is increased by one. At that time, the level is not necessarily increased every time the opponent character has been defeated. The level of the opponent character can be increased with the increase in the level of the player character. The condition to increase the level of the opponent character when the opponent character has been defeated can arbitrarily be determined When the process after the defeat of the opponent character is completed, the process returns to step S14.

<Point Recovery Process>

Figure 12:
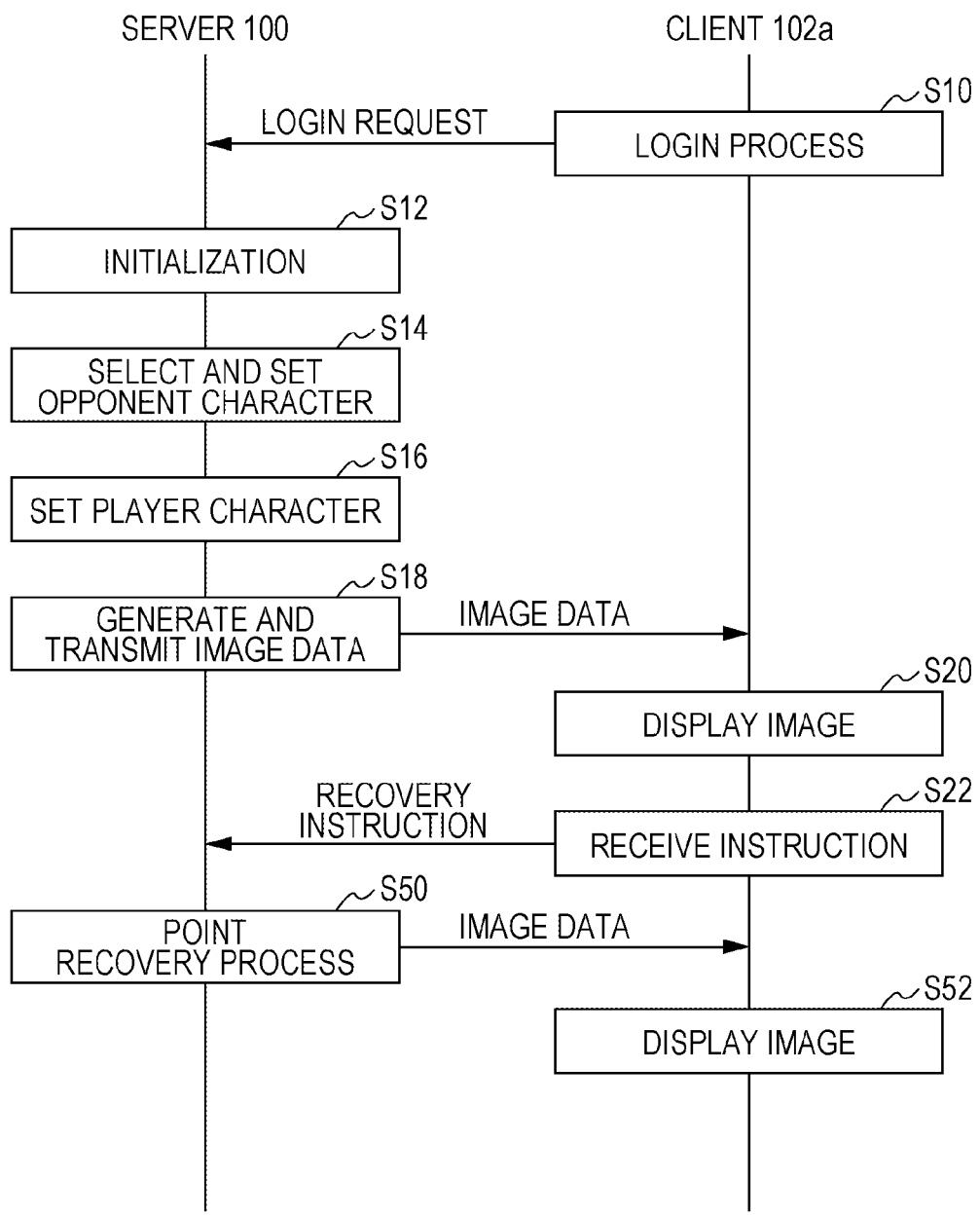
FIG. 12 is a flowchart illustrating a point recovery process according to an embodiment of the present invention.

Hereinafter, the process after the point recovery button 20b has been designated in step S22 will be described. The process is performed from step S50 in the flowchart in FIG. 12.

A point recovery process is performed in step S50. The server 100 increases the point by a predetermined value with subtracting one from the value of the point recovery of the player in the player character database. For example, the server 100 increases the point by one with subtracting one from the value of the point recovery. When the player A gives the instruction for a point recovery process to the server 100 in the example in FIG. 6, the server 100 increases the point of the player A from two to three with decreasing the value of the point recovery of the player A from three to two. Note that the number of points to be increased when the value of the point recovery has been decreased by one can arbitrarily be determined.

The server 100 updates the currently displayed image data to the image data according to the number of points of the player character to transmit the updated image data to the client 102. For example, the image data preferably displays the same number of marks (filled circles in FIG. 7) as the number of the increased points on the player character point image data 20c.

Note that, when the point recovery of the player in the player character database is zero, the image data indicating that the point recovery is impossible is transmitted to the client 102 without a point recovery process.

An image of the game is displayed on the client 102 in step S52. The client 102 receives the image data transmitted from the server 100 in step S50. The client 102 displays an image based on the image data on the image display unit such as a display using the display function such as a browser. This displays an image in which the value of the points after the point recovery is reflected on the client 102. Then, the process returns to step S22 and the client 102 comes into a state in which the client 102 waits for an attack instruction from the player.

Note that, when the point recovery of the player in the player character database is zero, the client 102 displays an image based on the image data indicating that the point recovery is impossible. After the image has been displayed for a predetermined period of time, the process returns to step S20 and the client 102 displays the image of the game again and comes into a state in which the client 102 waits for an attack instruction from the player.

<Backup Combo Process>

A backup combo process can be performed as a process for increasing the attack strength of a player character in the present embodiment. The backup combo process is a process for increasing the attack strength on the opponent character when a player character has given a predetermined damage to the opponent character.

For example, when the attack is the "serious damage" in step S30, a backup combo process is performed to increase the damage points to be given to the opponent character at the next attack. When the attack is the "serious damage" in step S30, the server 100 increases the value of the backup combo in the game database by one. The value of the backup combo is increased by one as long as the "serious damage" is repeated. On the other hand, when the attack is not a "serious damage", the value is reset to zero. After the value of the backup combo has been set as described above, the damage points are increased according to the value of the backup combo in step S30 at the next attack. For example, the damage points are increased by the value 1.5 times larger than the damage points as the value of the backup combo is increased by one.

However, the method for increasing the damage points is not limited to the above-mentioned method. It can arbitrarily be determined which type of attack can increases the damage points or how much value of the damage point is to be increased.

Figure 13:
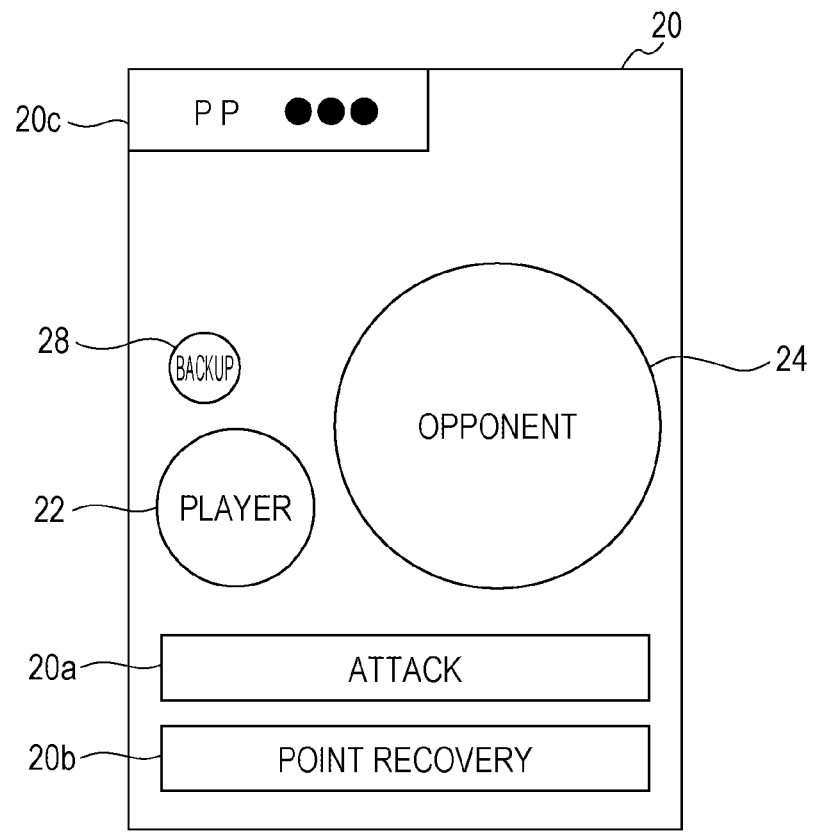
FIG. 13 is a diagram illustrating an exemplary image displayed during a backup combo process according to an embodiment of the present invention.

Furthermore, an image indicating that a backup combo process is performed is preferably displayed. For example, the server 100 generates the image data including an image of a backup character 28 as illustrated in FIG. 13 to transmit the image data to the client 102. The client 102 displays an image based on the received image data using the display function. In such a case, the number of backup characters 28 can be increased with the increase in the increasing rate of the damage points of the attack. This enables the player to know that a backup combo process is performed. The increase in the number of backup characters 28 enables the player to grasp how much attack strength the player currently has.

<Backup Play Process>

A backup play process can be performed as a process for increasing the attack strength of a player character in the present embodiment.

The backup play process is a process for increasing the attack strength on the opponent character when the player playing the game receives a backup from the other players in the group.

When a player starts the game, the server 100 transmits the image data indicating that the player currently plays the game and the other players can take part in the backup to the clients 102 of the other players included in a group member database in which the player is registered. Each of the clients 102 of the other players displays an image based on the image data to facilitate the other players' backup.

Figure 14:
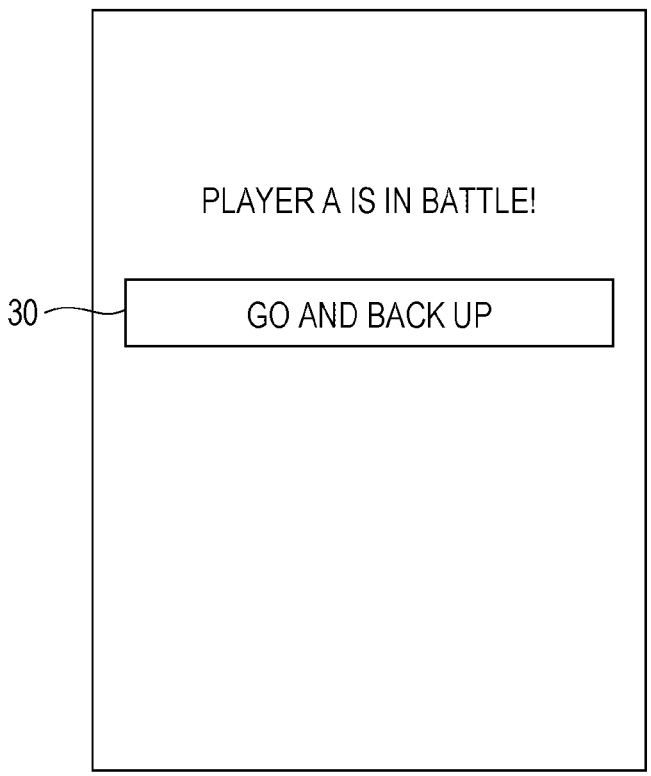
FIG. 14 is a diagram illustrating an exemplary instruction screen for a backup play process according to an embodiment of the present invention.

For example, when the player A in the group member database in FIG. 3 currently plays the game using the client 102a, the image data including the information indicating that "the player A is in a battle!" and a backup button 30 as illustrated in FIG. 14 is transmitted to the client 102b of the player B and the client 102c of the player C. The clients 102b and 102c display each an image based on the image data using the display function. When taking part in the backup, each of the other players selects the backup button 30 using the input function of each of the clients 102b and 102c to transmit a backup instruction to the server 100.

When receiving the backup instruction, the server 100 increases the value of the backup play in the game database by one. The value of the backup play is set according to the number of players who have transmitted the backup instruction. The value of the backup play is set as described above such that the damage points are increased according to the value of the backup play in step S30 at the next attack. For example, the damage points are increased by the value 1.5 times larger than the damage points as the value of the backup play is increased by one.

However, the method for increasing the damage points is not limited to the above-mentioned method. Any method in which the damage points are increased with the increase in the value of the backup play can be arbitrarily applied.

Figure 15:
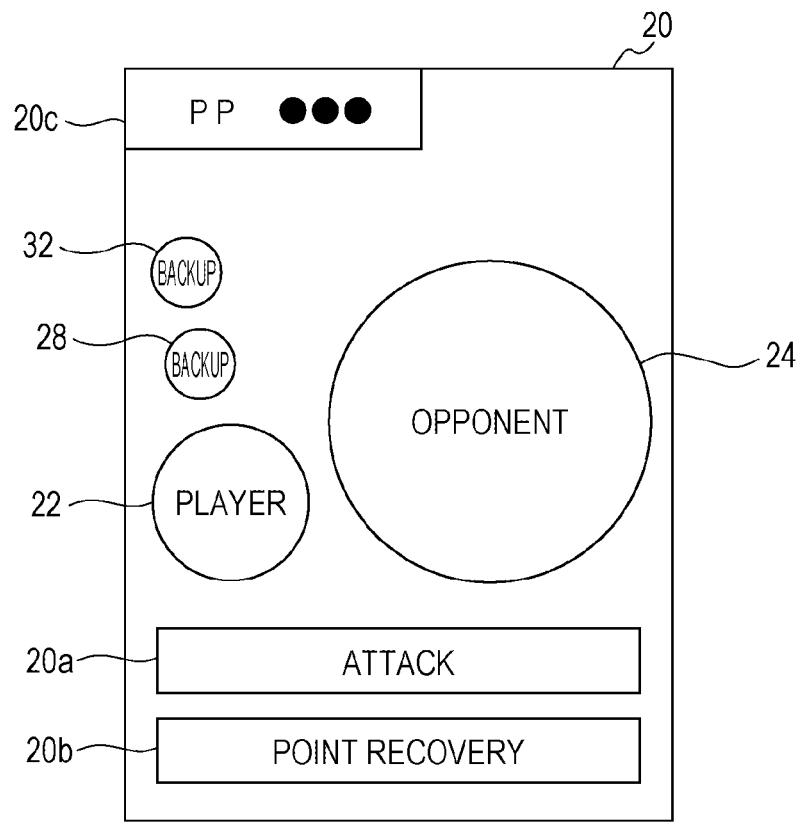
FIG. 15 is a diagram illustrating an exemplary screen displayed in a backup play process according to an embodiment of the present invention.

An image indicating that there is a player who has taken part in the backup play is preferably displayed. For example, the server 100 generates the image data including the image of the backup character 32 as illustrated in FIG. 15 to transmit the image data to the client 102. The client 102 displays an image based on the received image data using the display function. At that time, the number of the backup characters 32 can be increased with the increase in the number of players who have taken part in the backup. This enables the player to know that the player has the other player backing up the player. The increase in the number of backup characters 32 enables the player to grasp how much attack strength the player currently has.

Note that the backup combo process and the backup play process can separately be performed and can also be combined. In the combination of the backup combo process and the backup play process, the increase in the damage points can be determined in step S30 according to the value obtained by adding the value of the backup combo to the value of the backup play in the game database. Alternatively, the increasing rate obtained by multiplying the increasing rate of the backup combo by the increasing rate of the backup play can be applied.

Furthermore, an incentive can be given to the player who has taken part in the backup. The point recovery, the attack strength reinforcement of the player character of the player who has taken part in the backup, and addition of an item are cited as an example of the incentive. The incentive can vary depending on the number of backups in which the player has taken part.

When point recovery is given as an incentive, the server 100 increases the value of the point recovery of the player who has taken part in the backup and registered in the player character database. For example, the server 100 increases the value of the point recovery by one at each backup. When attack strength reinforcement is given as the incentive, the server 100 increases the value of the level of the player who has taken part in the backup and registered in the player character database. For example, the server 100 increases the level by one at each backup. When an item is given as the incentive, the server 100 transmits the image data indicating the item to the client 102 such that the client 102 can display the image of the item to notify the player of the addition of the item.

<Slipping Process>

A process for slipping the opponent character to the other player in the group can be performed during the play in the present embodiment.

Figure 16:
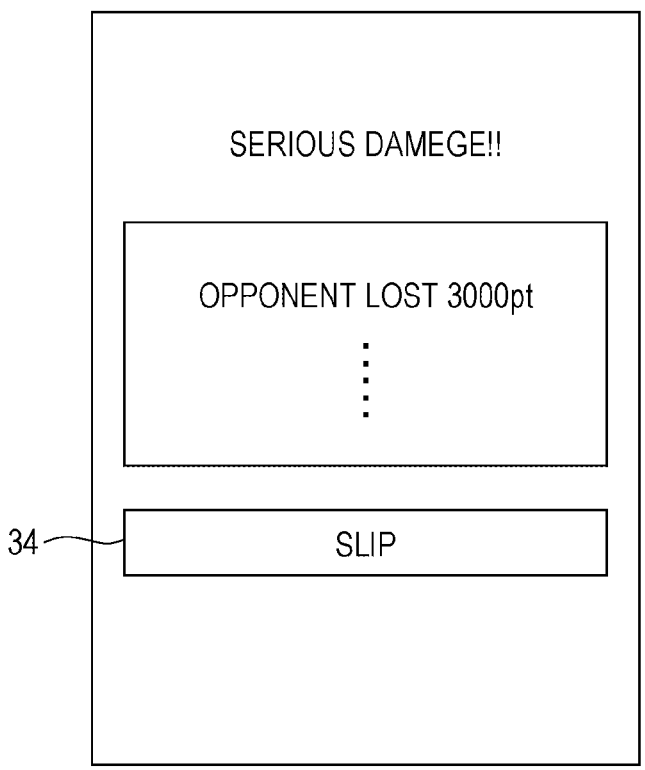
FIG. 16 is a diagram illustrating an exemplary instruction screen for a slipping process according to an embodiment of the present invention.

The image data transmitted from the server 100 to the client 102 in step S30 includes the image data indicating a slip button 34 as illustrated in FIG. 16 in the slipping process. When the player has selected the slip button 34, a slip instruction is transmitted to the server 100 in step S32.

Figure 17:
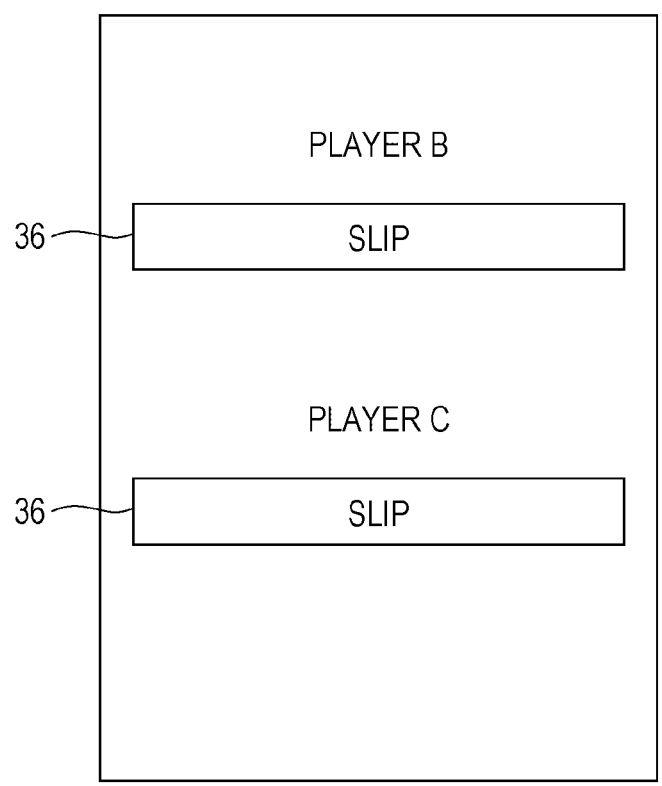
FIG. 17 is a diagram illustrating an exemplary instruction screen of a player who is a slipping destination according to an embodiment of the present invention.

The server 100 checks a player who currently logs in and is not in a battle among the other players who are registered as players in the group playing the game in the group member database in order to select the player as the destination to which the opponent character is to be slipped. The server 100 generates the image data including a selection button 36 linked to the selected other player as illustrated in FIG. 17 to transmit the image data to the client 102. The client 102 receives the image data to display an image based on the image data.

When the player has selected one of the selection buttons 36, the information indicating the selection button 36 has been selected is transmitted to the server 100. The server 100 specifies the player linked to the selection button 36 to perform a process for slipping the opponent character to the selected player.

The server 100 updates the game database of the selected player using the type of the opponent character and the value of the points of the opponent character in the game database of the player who has selected the player. The server 100 reads the level of the opponent character from the opponent character database of the selected player in order to register the level in the game database of the selected player. Then, the server 100 starts the process from step S16 in FIG. 2 with the selected player.

This enables the selected player to start a battle with the opponent character slipped from the player who has selected the player.

What is claimed is:

1. A server device that provides an electronic game between a player and an opposing player to a client device, the server device comprising:
    an image information generating unit that generates image information, the image information including information associated with a plurality of attack objects that are capable of being selected by a user associated with the player and are used within the electronic game to cause damage to the opposing player;
    a selection receiving unit that receives a selection by the player of a plurality of attack objects from among the plurality of attack objects;
    a setting unit that sets a damage amount to give to the opposing player for each of the selected attack objects by stochastically determining damage amounts for the selected attack objects after the selection receiving unit has received the selection of the attack objects;
    a processing unit that processes an attack on the opposing player using the damage amount given to the opposing player stochastically set by the setting unit; and
    an image display unit that causes the client device to display an image indicating the damage amount given to the opposing player.

2. The server device according to claim 1, wherein the setting unit sets the damage amount to give to the opposing player for each of the selected attack objects by stochastically selecting a damage identifier from a database that relates damage identifiers to a type of attack damage to give to the opposing player.

3. The server device according to claim 1, wherein the selection receiving unit is capable of receiving a selection of a number of the attack objects corresponding to a previously stored consumption point.

4. The server device according to claim 1, wherein the setting unit increases the damage amount to give to the opposing player according to the damage amount for the attack object previously selected in the selection receiving unit.

5. The server device according to claim 4, wherein the image information generating unit further generates image data including a backup character according to the set damage amount to give to the opposing player for the selected attack object.

6. The server device according to claim 1 that is connectable to a plurality of clients, comprises a backup receiving unit configured to receive a backup from the client, and increases the damage point of the selected attack object when receiving the backup.

7. The server device according to claim 6, wherein the image information generating unit further generates image data including a backup character when the game providing device has received the backup.

8. The server device according to claim 6 that performs a predetermined process on a player using a client doing the backup when receiving the backup.

9. The server device according to claim 1 that is connectable to a plurality of clients, and transfers information about an opponent character of a player using one of the clients to a player using other clients among the clients.

10. A method for providing an electronic game between a player and an opposing player, the method comprising:
    generating image information, the image information including information associated with a plurality of attack objects that are capable of being selected by a user associated with the player and are used within the electronic game to cause damage to the opposing player;
    receiving a selection by the player of a plurality of attack objects from among the plurality of objects; and
    setting a damage amount to give to the opposing player for each of the selected attack objects by stochastically determining damage amounts for the selected attack objects after the selection receiving unit has received the selection of the attack objects;
    processing an attack on the opposing player using the damage amount given to the opposing player stochastically set by the setting unit; and
    displaying an image indicating the damage amount given to the opposing player.

11. A non-transitory computer-readable storage medium storing a game program for causing a computer to perform operations the operations comprising:
    generating image information, the image information including information associated with a plurality of attack objects that are capable of being selected by a user associated with the player and are used within the electronic game to cause damage to the opposing player;
    receiving a selection by the player of a plurality of attack objects from among the plurality of attack objects; and
    setting a damage amount to give to the opposing player for each of the selected attack objects by stochastically determining damage amounts for the selected attack objects after the selection receiving unit has received the selection of the attack objects;
    processing an attack on the opposing player using the damage amount given to the opposing player stochastically set by the setting unit; and
    displaying an image indicating the damage amount given to the opposing player.

* * * * *